Aug. 23, 1960  H. H. MOORE, JR., ET AL  2,949,930
CHECK VALVE
Filed June 30, 1958
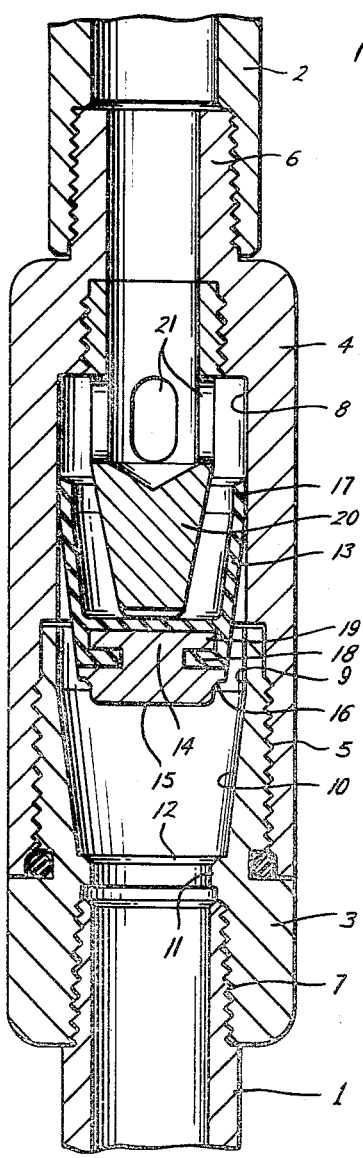
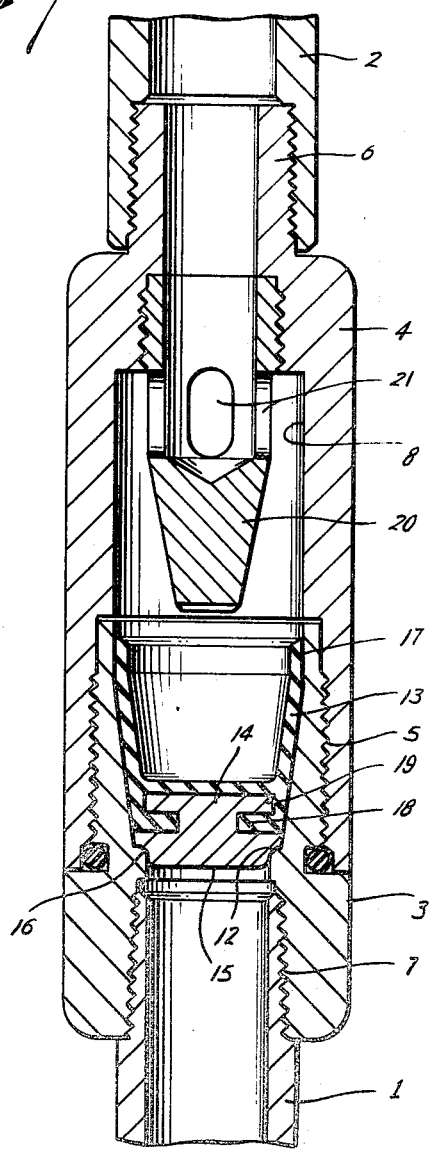
H. H. Moore, Jr.
W. H. Dietz
INVENTORS
BY G. C. Helmy
ATTORNEY

United States Patent Office 2,949,930
Patented Aug. 23, 1960

2,949,930

CHECK VALVE

Howard H. Moore, Jr., Houston, and William H. Dietz, Bellaire, Tex., assignors to Camco, Incorporated, Houston, Tex., a corporation of Texas Filed June 30, 1958, Ser. No. 745,678

1 Claim. (Cl. 137—516.29)

This invention relates to an improved check valve which operates in response to differential pressures applied on opposite sides thereof for accommodating free fluid flow in one direction and obstructing flow in the other direction.

An object of the invention is to provide a simplified assembly comprising a few parts of low cost which cooperate in effectively sealing back flow with narrow metal to metal valving surfaces and additional large area contact surfaces afforded by a sealing face on a solid wall and a mating sealing face on a flexible deformable wall which hugs the solidly backed sealing face with a close fit under pressure of the fluid to be sealed off whereby face to face contact of the pressure deformable wall against the solidly resistant wall becomes tighter and more resistant to leakage the higher the fluid pressure.

A further object of the invention is to provide a self acting valve assembly having a self centering shiftable closure element slidably contained within an enlarged central bore or passage in a hollow housing whose opposite end portions are of reduced diameter and which housing is made up of a pair of separately machined parts secured in end to end relation with internal bores at adjoining ends affording coaxial cylindrical slide surfaces of like diameters and from one of which the bore continues at a uniform rate of decreasing diameter or taper toward the smaller end and terminates in an annular valve seat for engagement and disengagement therewith of the shiftable closure element formed to cup shape and whose base constitutes a seat engaging portion and whose axially projecting annular skirt is molded of elastic rubberlike material with a peripheral surface flared outwardly in general conformity with the tapered bore outline to a terminal cylindrical band of a diameter to have close wiping contact and a valve centering fit with the cylindrical bearing surface of the housing during valve travel.

Another object of the invention is to provide an improved valve having an elastic outwardly flared skirt whose relatively thin flexible wall is held in sealing contact with the housing wall by the fluid whose back flow is being checked and whose small diameter base is stiff and when seated exposes only its restricted surface area to forward flow as compared to the combined areas of the base and flared skirt once the valve is unseated, whereby a snap opening action is obtained and a wider differential unseating pressure is required for the initial unseating of the valve than is needed to maintain the valve unseated and raised against a stop pin carried by the housing for abutment with the stiff valve base and of smaller diameter than the internal diameter of the elastic skirt for reception therein in annularly spaced relation with the skirt wall so as to accommodate inward wall deflection or contraction during forward fluid flow through the housing.

For a full disclosure of the invention, reference will be made to the accompanying drawing in which Figs. 1 and 2 are vertical sectional views showing the improved valve assembly in static unseated and seated positions respectively.

The hollow body or housing providing the flow control passage and joining an inflow pipe 1 and an outflow pipe 2 comprises two separately machined tubular parts 3 and 4 screw threaded together as at 5 or otherwise joined at final assembly in end to end succession. The housing parts 3 and 4 may be of steel or other suitable material formed to afford an enlarged central cavity or cage for reception of an axially shiftable valve element. Beyond the cavity the opposite ends of the assembled housing are of reduced internal diameter with the housing part 4 terminating in an externally screw threaded nipple 6 for connection with the outlet pipe 2 and the housing part 3 terminating in an internally screw threaded bore 7 for connection with the inflow pipe 1.

The valve receiving cavity is partly in each of the housing parts 3 and 4 and comprises a large cylindrical bore 8 extending axially in the housing part 4 from an end wall at the terminal nipple 6 and a continuing like cylindrical bore 9 of short length in the adjoining end of the housing part 3 and from which projects a portion 10 of tapered or gradually decreasing diameter for approximately one-third of the length of the cavity. At its large end the tapered bore 10 is of the same diameter as the cylindrical bore 9 and at its small end the tapered bore terminates at an internal shoulder 11 whose axially inner corner is beveled as a fixed circular valve seat 12.

The pressure actuated self centering bore closing valve element slidably contained within the housing cavity is generally of cup shape and comprises an annular skirt or wall 13 extending from its disklike bottom wall or base 14 in the direction away from the reduced end of the tapered bore 10. In diameter the base 14 corresponds to the reduced end of the tapered bore 10 and closely fits the same as shown in Fig. 2. A round nose extension 15 on the base is of approximately the diameter of the central opening through the shouldered portion 11 of the housing for reception therein and the resulting corner is beveled, as at 16, for making an annular tight closure on the similarly beveled seat 12. Engagement of these valve parts affords a limit stop at one end of valve travel.

The valve skirt 13 is a thin wall flaring outwardly from the base 14 and its peripheral surface is of frusto-conical shape and generally similar in length and taper angle to the bore portion 10. This wall 13 terminates at its larger end in a cylindrical lip or band 17 arranged for slide bearing contact with the cylindrical bore portions 8 and 9. The wall of the cupped skirt is a molded elastic deformable rubberlike material such as Hycar and the cup base 14 preferably is a stiff and relatively inelastic material such as steel. As shown in the drawing, the rubber skirt and the metal base have overlapping annular flanges 18 and 19 affording an interlocking tongue and groove attachment. Additionally, the abutting surfaces can be cemented together or bonded by vulcanization. In final molded shape, the flared skirt at its cylindrical band 17 has an unstressed diametrical dimension equal to or slightly greater than the diameter of the housing cavity bore 8 for a close slide bearing fit with the bore wall and elastic resistance to deflection therefrom.

As a limit stop to valve travel away from its seat, the inside of the cup base is engageable with a transversely slotted tip of a stud 20 which depends into the housing cavity from a hollow end portion of the pin aligned with the bore of the nipple 6 and mounted in a counterbored portion of the bore by a screw threaded connection. One or more windows 21 extending laterally through the wall of the hollow portion of the stop stud 20 communicate with the valve cavity. The dependent stop stud 20 is of a diameter considerably less than the inside diameter of the annular skirt 13 and the radial clearance accommodates inward deflection or contraction of the flexible skirt wall under pressure of fluid acting on the skirt periphery and flowing from the inlet 1 into the annular convergent space (see Fig. 1) between the tapered skirt and the cylindrical bore when the cup is raised from the seat 12.

Fig. 1 illustrates the position of the parts when travel of the valve under forward fluid flow force has reached the limit stop 20 but before the elastic skirt 13 has yielded inwardly and while the terminal band 17 of the frusto-conical skirt is still in sealing contact with the cylindrical housing wall 8 of the passage. Once that position is established, the predominant pressure of inflowing fluid breaks wall contact at the normally outwardly pressed band 17 and inwardly presses on the skirt periphery to collapse the bendable skirt away from the housing wall for opening the valve to maximum outward flow volume. Annular clearance between the rim of the valve base 14 and the cylindrical bore of the cavity in relation to the flow area of the pipes 1 and 2 can be the same or less, so as either to pass the full volume of flow from the pipe 1 or to meter the amount of flow past the valve, as may be desired.

Whenever forward flow pressure is advance of the valve decreases below that beyond the valve, the valve will respond by closing against reverse flow. At such time, elastic recovery of the rubber skirt will first reestablish sealing contact between the terminal band 17 and the cavity wall, as seen in Fig. 1. The differential or predominant pressure of fluid on the outlet side of the cup valve presses outwardly on the inside of the skirt wall for an expanding tendency and maintenance of the peripheral seal and also presses on the cup base and biases the slide valve axially toward its seated limit. Throughout valve slide travel in the housing cavity, the skirt has a wiping sealing action with the housing wall and at the final seated position illustrated in Fig. 2, the periphery of the tapered skirt comes into snug bearing contact throughout its entire area with and is solidly backed against excessive expansion by the housing wall surface at the tapered bore 10. Thereafter, the higher the pressure internally of the cupped valve, the tigher will be the sealing face to face contact of the rubber skirt and its mating solid wall surface. The shape of the elastic wall under pressure conforms itself to the shape of the solid wall and eliminates the need for extreme manufacturing accuracy in matching these two shapes. Supplementing the rubber seal contact, the beveled seating surfaces 12 and 16 will fit together in close metal to metal contact. These seating surfaces are aligned during the slide bearing of the annular skirt on the cavity cylindrical wall and the contering action also lines up the nose extension 15 with the central bore of the annular shoulder 11 as these parts come into nested relation in the final increment of valve travel in the closing direction.

In fully closed position, the area of the slide valve exposed to forward flow pressure is restricted to that of the reduced diameter nose extension 15 below the closed seat 12 and the area acted on by reverse flow pressure equals the larger diameter of the bore 8. Consequently, forward flow pressure somewhat higher than opposing reverse pressure will first slightly lift the valve and once the seats 12 and 16 are separated, there will be exposed the additional circular valve area beyond the seat 16 for accelerating valve travel and enabling flow between the cavity wall and rubber skirt with resultant inward skirt deflection and clearance passage toward the outlet end of the housing.

What is claimed is:

A check valve comprising a hollow housing having an annular wall defining an axial fluid flow passage through the housing and said passage including a valve chamber coaxial therewith and intermediate opposite ends of the annular wall, said wall throughout one portion of the length of the chamber presenting an elongated cylindrical interior surface and throughout an adjoining elongated portion of the chamber length having its interior surface tapered from the cylindrical portion with the large end of the tapered surface of the same diameter as the cylindrical surface and merging therewith as a continuation thereof, an annular valve seat carried by said wall and projected inwardly therefrom into the passage at the small end of the tapered surface, a cup shaped free piston floatingly contained in said chamber and movable axially to and from said annular seat in response to differential pressures on opposite sides thereof, said cup shaped piston having a base of a diameter approximating that of the small end of said tapered portion and engageable at one limit of piston movement with said annular valve seat to close the passage and having an axially elongated skirt of elastic deformable material whose peripheral surface is of frusto-conical shape and is secured at its small end to and is projected axially from said base to the skirt large end, said skirt large end being of substantially cylindrical form which in the absence of a collapsing pressure differential has a peripheral diameter as great as the inside diameter of the cylindrical wall portion and has a sliding seal fit thereto and also serves to center the piston in its movement, means on the housing engageable by said piston to limit piston movement away from said seat, the taper of said skirt substantially corresponding with that of said tapered wall to seal thereon under fluid pressure interiorly of the skirt coincident with the engagement of the base with said annular seat and to be spaced from the cylindrical wall portion for exposure of its peripheral surface to fluid pressure exteriorly of the skirt while its large end is still in sealing relation with said cylindrical wall portion.

References Cited in the file of this patent

UNITED STATES PATENTS

| 2,202,123 | Strode | May 28, 1940 |
| 2,495,880 | Volpin | Jan. 31, 1950 |
| 2,571,497 | Stewart | Oct. 16, 1951 |
| 2,603,951 | Ross | July 22, 1952 |
| 2,771,091 | Baker et al. | Nov. 20, 1956 |

FOREIGN PATENTS

| 144,438 | Australia | Dec. 10, 1951 |
| 1,031,887 | France | Mar. 25, 1953 |
| 90,275 | Norway | Oct. 28, 1957 |